United States Patent [19]
Abramson et al.

[11] Patent Number: 6,153,048
[45] Date of Patent: Nov. 28, 2000

[54] PRESSURE SEALER ROLLER ARRANGEMENT

[75] Inventors: Richard J. Abramson, Glen Ellyn; Rudolph Retzl, Tinley Park, both of Ill.

[73] Assignee: The Hedman Company, Elk Grove Village, Ill.

[21] Appl. No.: 09/244,730

[22] Filed: Feb. 5, 1999

[51] Int. Cl.$^7$ ................................................. B32B 31/00
[52] U.S. Cl. ........................ 156/555; 156/579; 156/582; 100/176
[58] Field of Search ................................ 156/555, 579, 156/580, 582; 100/160, 176

[56] References Cited

U.S. PATENT DOCUMENTS

| | | | |
|---|---|---|---|
| 5,133,828 | 7/1992 | Jacques | 156/555 |
| 5,183,527 | 2/1993 | Parker | 156/555 |
| 5,201,464 | 4/1993 | File | 229/305 |
| 5,391,138 | 2/1995 | Abramson et al. | 493/421 |
| 5,540,806 | 7/1996 | Traise | 156/555 |
| 5,639,339 | 6/1997 | Couillard | 156/555 |
| 5,656,118 | 8/1997 | Traise | 156/290 |
| 5,735,997 | 4/1998 | Reinders | 156/495 |
| 5,772,841 | 6/1998 | Lindsay | 156/555 |
| 5,853,531 | 12/1998 | Murphy et al. | 156/555 |

*Primary Examiner*—James Sells
*Attorney, Agent, or Firm*—Rockey, Milnamow & Katz, Ltd.

[57] ABSTRACT

A mounting arrangement is provided for rollers in a pressure sealer wherein a folded business form is fed along a processing path between at least one pair of cooperating, rotating, first and second rollers. A support structure is provided for holding the rollers with the first roller in a fixed location while accommodating movement of a second roller along a plane in either of two opposite directions toward and away from the first roller. Each roller has a pressure-applying, cylindrical surface. Each roller has two spaced-apart bearing structures for engaging the support structure to accommodate rotation of a respective one of the rollers and for engaging one of the bearing structures of the other rollers to define a predetermined minimum spacing between the cylindrical surfaces of the first and second rollers. At least one spring is provided for urging the bearing structures of the second roller toward the bearing structures of the first roller. At least one adjusting bar is pivotally mounted on the support structure for bearing a load imposed by the spring. A cam is provided for engaging the adjustment bar and urging the adjustment bar to compress the spring. An operating lever extends from the cam and can be pivoted to rotate the cam to effect a reduction or increase in the compression of the spring.

20 Claims, 9 Drawing Sheets

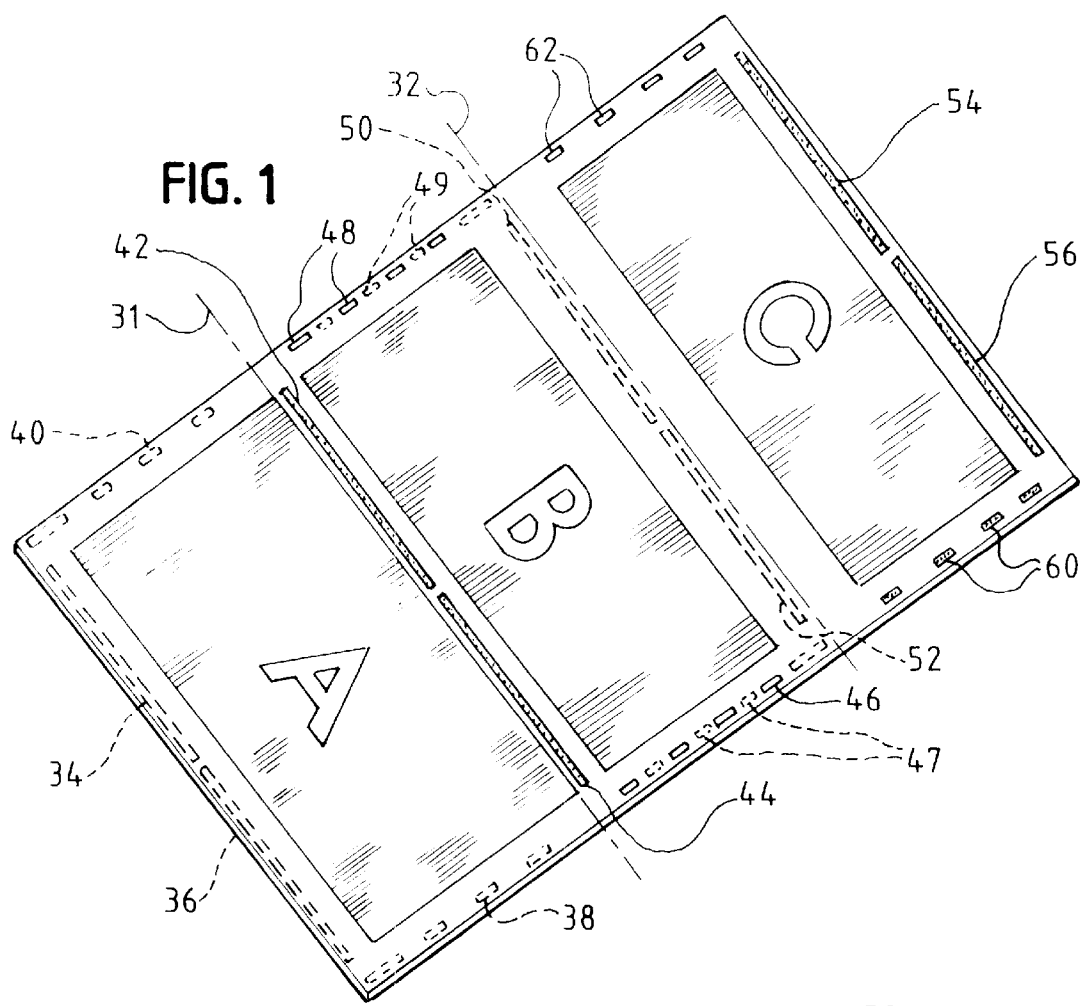
FIG. 1
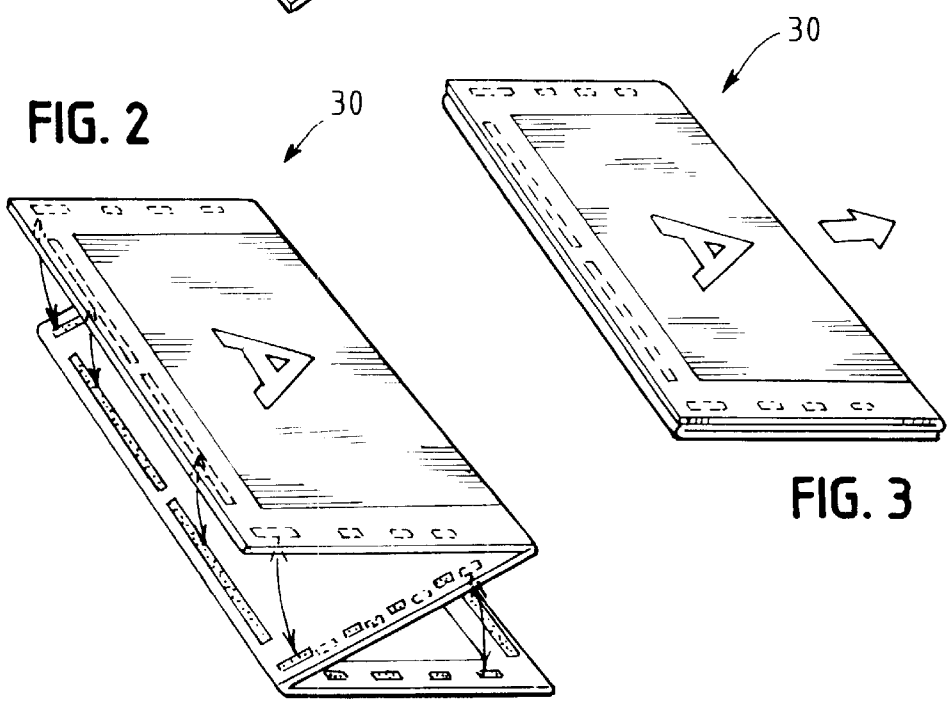
FIG. 2
FIG. 3

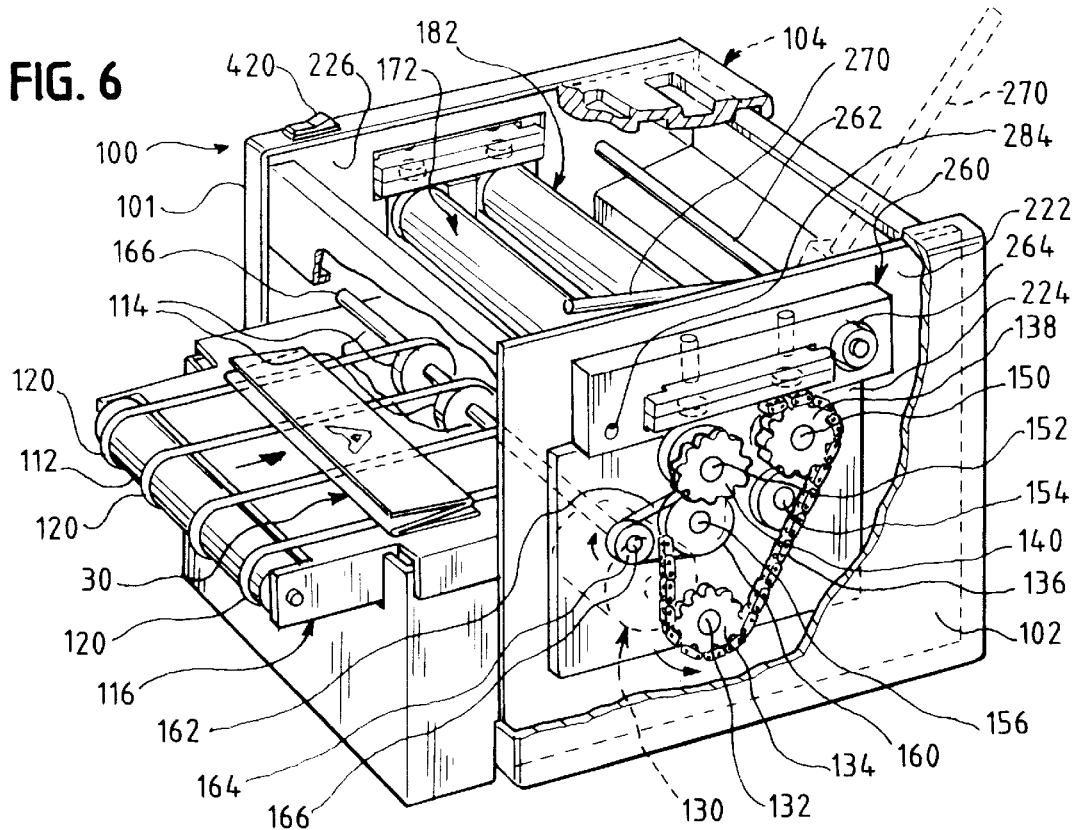
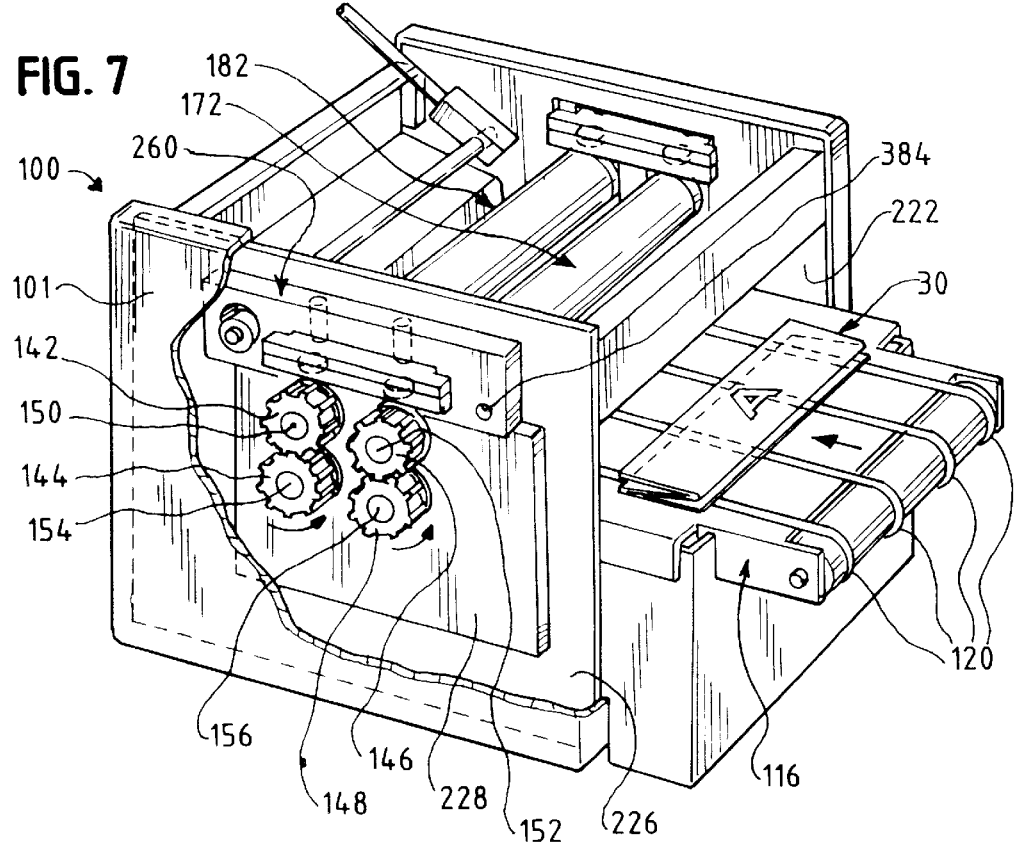

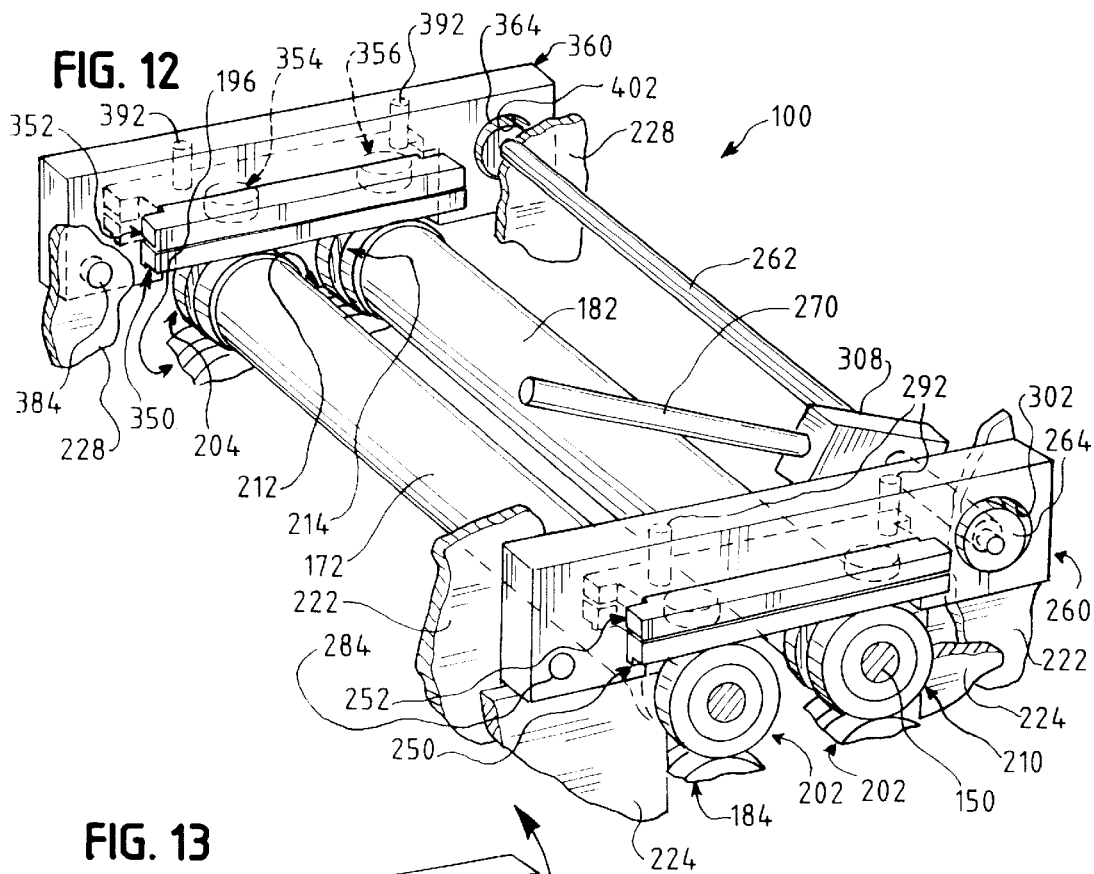
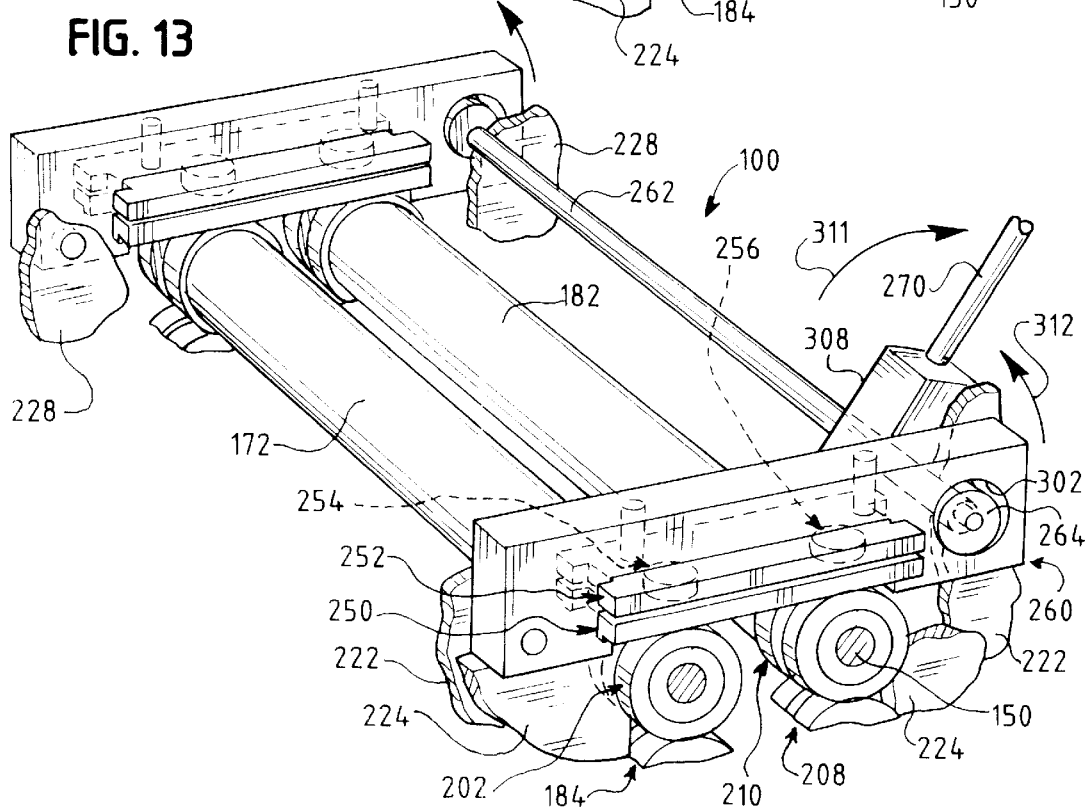

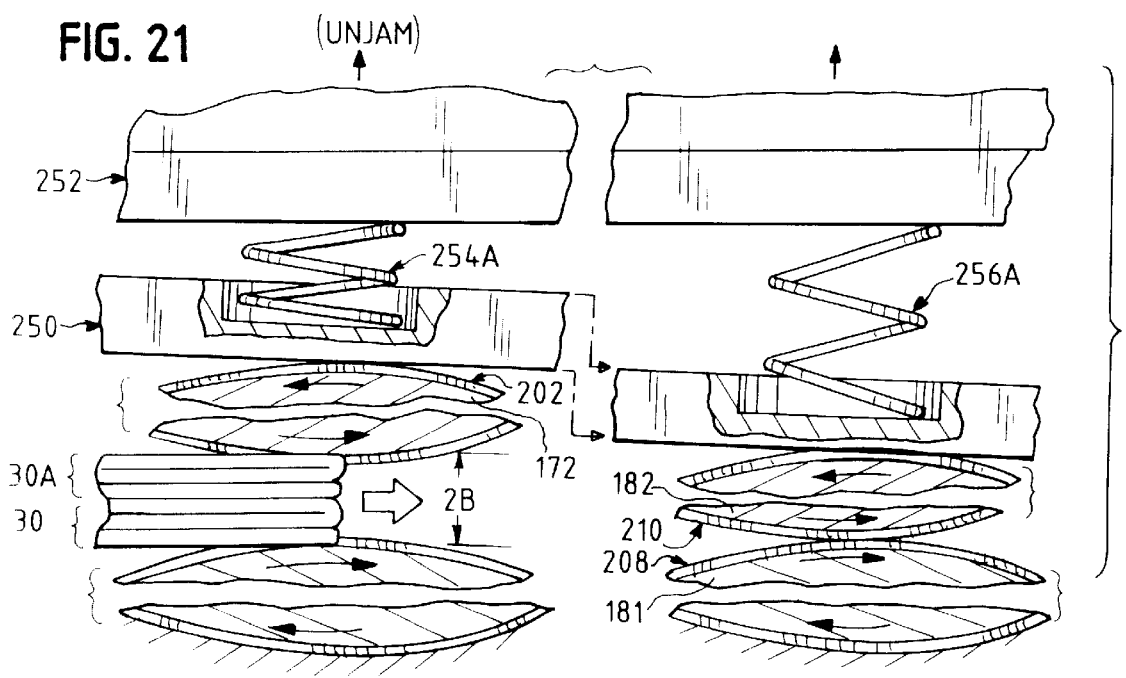
FIG. 21
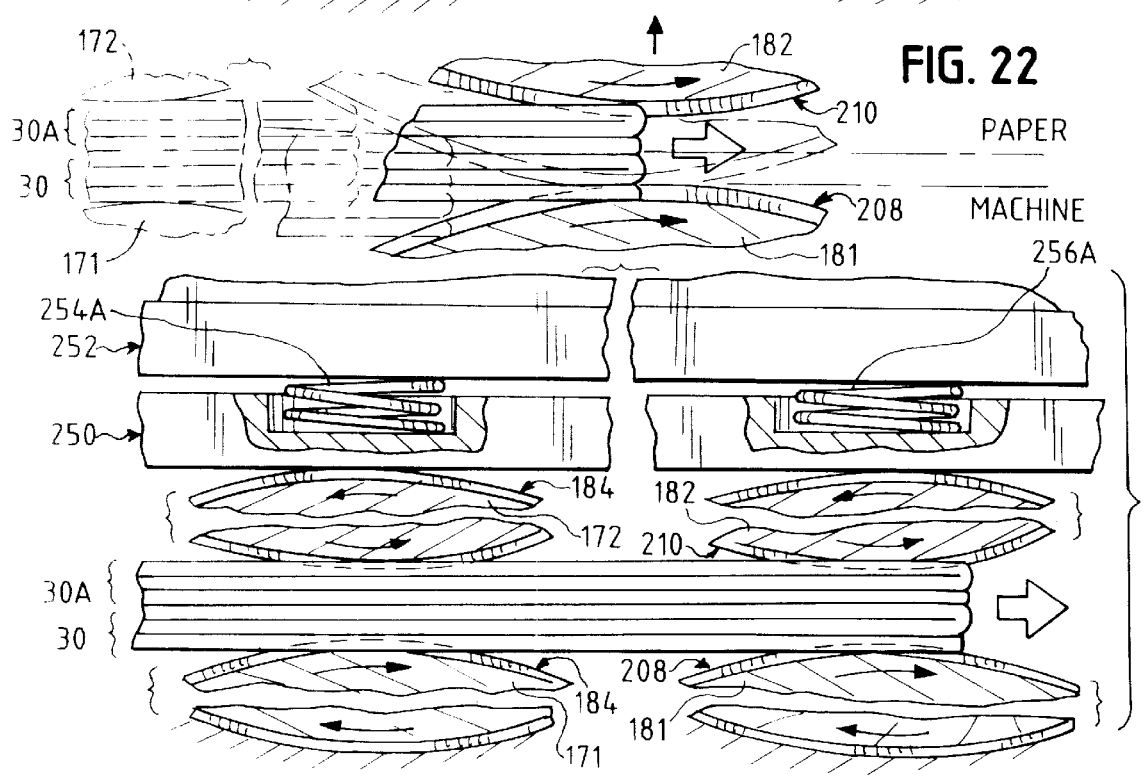
FIG. 22
FIG. 23

PRESSURE SEALER ROLLER ARRANGEMENT

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to apparatus for applying pressure to a folded sheet which has adhesive-coated regions for sealing folded portions of the sheet together.

BACKGROUND OF THE INVENTION AND TECHNICAL PROBLEMS POSED BY THE PRIOR ART

Business forms which can be folded, including forms which can be folded for mailing, have been developed to employ pressure-sensitive adhesive to maintain each form in a folded, sealed closed condition. For example, a pressure seal C-fold mailer business form is disclosed in U.S. Pat. No. 5,201,464. As used herein, the terms "business form" and "form" include a variety of sheets or documents that may or may not bear printed indicia.

Various apparatus have been developed for applying pressure to such folded forms to "activate" the adhesive and cause the folded sheet portions of the business form to stick together. One such apparatus is sometimes described as a "pressure sealer," and typically employs cooperating pairs of rollers through which the folded business form is fed. Examples of such apparatus are disclosed in U.S. Pat. Nos. 5,133,828, 5,183,527, 5,656,118, and 5,772,841.

Pressure sealer apparatus can be designed to accommodate a folded business form having a specific thickness in the as-folded condition. The apparatus may employ an adjustment mechanism for adjustably setting the apparatus to handle business forms of varying thicknesses in the as-folded condition.

Nevertheless, the operator of the apparatus may inadvertently feed into the apparatus a business form that is thicker than the type for which the apparatus has been designed or set. Also, two or more folded business forms may be inadvertently fed together, one on top of the other into the apparatus. In either case, the increased thickness of the form or forms in the apparatus may cause the apparatus to "jam" and stop feeding the form or forms through the apparatus.

The apparatus motor does not have enough power to feed the thicker form or forms through the apparatus, and the motor may "stall," and/or a control circuit in the apparatus may effect termination of the motor operation, until the thicker form or forms are manually removed.

It may be difficult to release a jammed form or forms because such apparatus typically employs spring-biased rollers to apply relatively high pressure to the forms, and the high forces imposed on the apparatus components and forms must be accommodated during normal operation and must also be overcome during special "jam-clearing" operations.

It would be desirable to provide an improved system for accommodating release or removal of a form or forms that have become jammed in the apparatus.

Preferably, such an improved system should permit release of the form or forms without requiring disassembly of portions of the apparatus.

Further, such a system should be simple to operate and should be relatively inexpensive to manufacture and incorporate in the apparatus.

It would also be desirable if such a system could be employed in a pressure sealer apparatus that is part of an overall combination machine that could include an upstream sheet folder apparatus which may have a pair of rollers that could also function as part of the pressure sealer apparatus.

It would also be desirable to provide an improved system which could accommodate different sheet thicknesses as well as a different number of folds of such a sheet.

Additionally, it would be beneficial if such a system could be incorporated in apparatus that is relatively small. In particular, it would be advantageous to provide the system with a configuration and size that could be accommodated in a relatively small, table-top machine for use on an office desk or table.

The present invention provides an improved roller system for use in a pressure sealer which can accommodate designs having the above-discussed benefits and features.

BRIEF SUMMARY OF THE INVENTION

The present invention provides an arrangement for mounting rollers in a pressure sealer for activating pressure-sensitive adhesive on one portion of a folded business form to seal the one portion to another portion of the business form wherein the business form is fed along a processing path between at least one pair of cooperating, rotating, first and second rollers.

The system can be provided in apparatus to accommodate business forms of varying thickness and to accommodate forms having a number of different folds.

The system is very easy to operate, and permits the quick and safe release of a "jam" of a business form that is too thick or of a jam caused by two or more business forms that are inadvertently fed together one on top of the other.

The system accommodates a rapid clearing of the jam and permits the released form or forms to be quickly fed through the apparatus.

According to one aspect of the invention, the arrangement includes support means for holding the rollers with the first roller at a fixed location while accommodating movement of the second roller along a plane in either of two opposite directions toward and away from the first roller.

Each roller has a pressure-applying, cylindrical surface. Each roller has two spaced-apart bearing means for engaging the support means to accommodate rotation of a respective one of the rollers and for engaging one of the bearing means of the other roller to define a predetermined minimum spacing between the cylindrical surfaces of the first and second rollers.

At least one biasing means is included for urging the bearing means of the second roller toward the bearing means of the first roller.

At least one adjustment bar is pivotally mounted on the support means for bearing a load imposed by the one biasing means.

A cam means is included for engaging the adjustment bar and urging the adjustment bar to compress the biasing means.

The system includes an operating lever which extends from the cam means and which can be pivoted to rotate the cam means to effect a reduction or increase in the compression of the biasing means. The apparatus is normally operated with increased biasing means compression. If a jam occurs, the lever is pivoted to reduce the compression of the biasing means. This allows the rollers to continue rotating to feed the form or forms through the apparatus to clear the jam.

According to another aspect of the invention, the arrangement includes support means for holding the rollers with the first roller at a fixed location while accommodating movement of the second roller along a plane in either of two opposite directions toward and away from the first roller.

A piece of resilient, synthetic polymer material is retained under compression between bottom and top retention blocks which are carried on the support means to accommodate movement of the bottom retention block toward and away from the top retention block while the bottom retention block engages a portion of the second roller for imposing the load from the polymer material on the second roller.

The system also includes adjustment means carried on the support means for engaging the top retention block and adjustably setting the maximum spacing of the top retention block from the bottom retention block to effect a reduction or increase in the compression of the polymer material.

According to another aspect of the invention, the arrangement includes a roller support frame defining at least one pair of recesses which are spaced-apart so that one of the recesses is on one side of the processing path and so that the other of the recesses is on the other side of the processing path.

Each the roller has a pressure-applying, cylindrical surface. Each roller has two spaced-apart bearing structures which are each received in a respective one of the recesses to mount the pair of rollers extending across the processing path between the recesses. The frame prevents movement of the bearing structures of the first roller away from the bearing structures of the second roller. The recesses accommodate movement of the bearing structures of the second roller away from the bearing structures of the first roller. Each bearing structure in each one of the recesses accommodates rotation of a respective one of the rollers and has an exterior surface engaging an exterior surface of the other bearing structure in the one recess to define a predetermined minimum spacing between the roller cylindrical surfaces.

At least one compression spring is provided for urging the bearing structures of the second roller toward the bearing structures of the first roller.

At least one adjustment bar is pivotally mounted to the frame for bearing a load imposed by the compression spring.

A shaft is included with a cam surface portion for engaging the adjustment bar and urging the adjustment bar to compress the spring.

An operating lever extends from the shaft and can be pivoted to rotate the shaft and cam surface portion to effect a reduction or increase in the compression of the spring.

Yet another aspect of the invention is incorporated in a pressure sealer for activating pressure-sensitive adhesive on one portion of a folded business form to seal the one portion to another portion of the business form wherein the folded business form is fed along a processing path between a pair of cooperating, rotating, first and second inlet rollers and a pair of cooperating, rotating, first and second outlet rollers. According to this aspect of the invention, an arrangement is provided for mounting the rollers. The arrangement includes a roller support frame defining (a) a pair of inlet recesses spaced apart so that one of the inlet recesses is on one side of the processing path and so that the other of the inlet recesses is on the other side of the processing path, and (b) a pair of outlet recesses spaced apart so that one of the outlet recesses is on one of the processing path and so that the other of the outlet recesses is on the other side of the processing path.

Each roller has a pressure-applying, cylindrical surface. Each roller has two spaced-apart bearing structures which are each received in a respective one of the recesses to mount the pair of inlet rollers extending between the inlet recesses and to mount the pair of outlet rollers extending between the outlet recesses. The frame prevents movement of the bearing structures of the first inlet roller away from the bearing structures of the second inlet roller. The frame also prevents movement of the bearing structures of the first outlet roller away from the bearing structure of the second outlet roller. The inlet recesses accommodate movement of the bearing structures of the second inlet roller away from the bearing structures of the first inlet roller. The outlet recesses accommodate movement of the bearing structures of the second outlet roller away from the bearing structures of the first outlet roller. Each bearing structure in each one of the recesses accommodates rotation of a respective one of the rollers and has an exterior surface engaging an exterior surface of the other bearing structure in the one recess to define a predetermined minimum spacing between the cylindrical surfaces of the inlet rollers and to define a predetermined minimum spacing between the cylindrical surfaces of the outlet rollers.

Two inlet compression springs are provided with a top end and a bottom end. Each inlet compression spring is associated with a respective one of the inlet recesses to urge one of the bearing structures of the second inlet roller toward one of the bearing structures of the first inlet roller in a respective one of the inlet recesses.

Two outlet compression springs are each provided with a top end and a bottom end. Each outlet compression spring is associated with a respective one of the outlet recesses to urge one of the bearing structures of the second outlet roller toward one of the bearing structures of the first outlet roller in a respective one of the outlet recesses.

Two adjustment bars are each pivotally mounted to the frame for bearing a load imposed by one of the inlet compression springs and by one of the outlet compression springs.

A shaft is provided with cam surface portions for engaging the adjustment bars for urging the adjustment bars to compress the springs.

An operating lever extends from the shaft and can be pivoted to rotate the shaft and cam surface portions to effect a reduction or increase in the compression of the springs.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a perspective view of a typical sheet or business form with regions or strips of pressure-sensitive adhesive on both sides;

FIG. 2 is a perspective of the sheet or form shown in FIG. 1, and FIG. 2 shows the sheet or form being folded about two-fold lines to form three, overlapping, folded portions;

FIG. 3 is a perspective view similar to FIG. 2, but FIG. 3 shows the final configuration of the folded sheet or form prior to being fed into a pressure sealer apparatus incorporating a roller arrangement in accordance with the present invention as shown in FIG. 4;

FIG. 6 is a view similar to FIG. 4, but FIG. 6 shows portions of the apparatus broken away to illustrate interior details, and FIG. 6 shows the jam-clearing operating lever moved to the jam-release position in phantom as illustrated in dashed lines;

FIG. 7 is a perspective view of the pressure sealer apparatus from the side opposite from that visible in FIG. 6, and FIG. 7 shows the pressure sealer apparatus with the jam-clearing operating lever in the jam-release position;

FIG. 12 is a fragmentary, perspective view of a portion of the top of the pressure sealer apparatus shown with the jam-clearing operating lever in the normal operating position;

FIG. 13 is a view similar to FIG. 12, but FIG. 13 shows the jam-clearing operating lever rotated to the jam-release position;

FIG. 14 shows the jam-clearing operating lever in the normal position;

FIG. 17 shows the spring at three different heights: (1) an uninstalled height, (2) a normally installed, operating pre-load height, and (3) a jam-clearing release height; and FIGS. 18–23 are simplified, partially schematic, partial cross-sectional, side elevational views of the pressure roller and spring arrangement in the pressure sealer apparatus showing the operation of the apparatus as a folded business form is fed therethrough, and for purposes of illustration, the polyurethane disk springs are illustrated as conventional, helical coil springs so that the degree of compression or extension of the springs can be more readily seen, and FIGS. 18–19 illustrate the sequential operation of the pressure sealer apparatus with one tri-folded business form, and FIGS. 20–23 illustrate the sequential operation of the apparatus with two tri-folded business forms initially entering the machine and causing a jam (FIGS. 19 and 20) and subsequently being carried through the pressure sealer as the jam is cleared (FIGS. 21–23).

DETAILED DESCRIPTION

Figure 4:
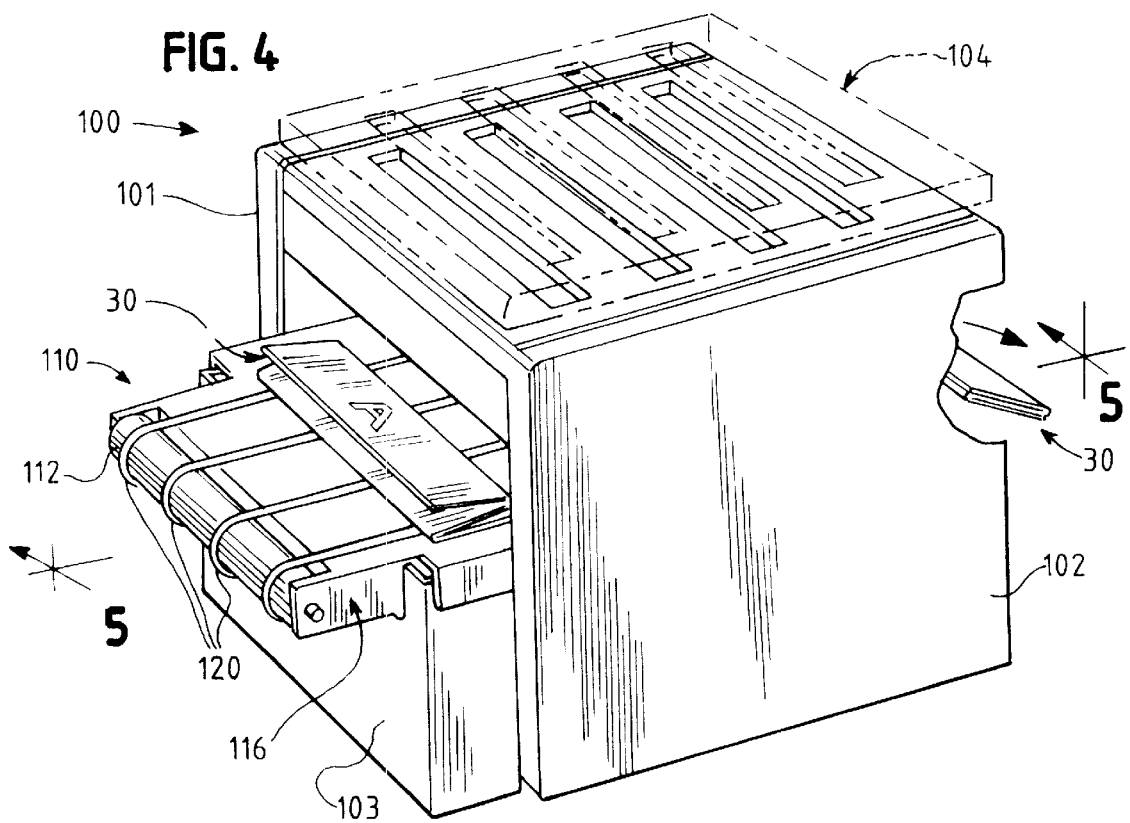
FIG. 4 is a perspective view of a pressure sealer apparatus incorporating the roller arrangement of the present invention, and the pressure sealer apparatus is shown with a folded, but unsealed, form being fed into the front, inlet end of the pressure sealer apparatus and with a completed, pressure-sealed form being ejected from the rear, outlet end of the pressure sealer apparatus.

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus incorporating the system components of this invention is described in the normal (upright) operating position, and terms such as upper, lower, horizontal, etc., are used with reference to this position. It will be understood, however, that the apparatus may be manufactured, stored, transported, and sold in an orientation other than the position described.

Figures illustrating the apparatus show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

FIGS. 1–3 illustrate one embodiment of a sheet or business form 30 which contains pressure-sensitive adhesive and which may be folded along two fold lines to form a tri-folded configuration. With reference to FIG. 1, the form 30 may be regarded as having two intended fold lines, a first fold line 31 and a second fold line 32. The fold lines 31 and 32 divide the sheet or form 30 into three equal parts, part A, part B, and part C. However, the parts A, B, and C could be unequal. The form 30 has a top surface facing toward the viewer in FIG. 1, and has a bottom surface facing away from the viewer in FIG. 1. Part A has two lines of adhesive 34 and 36 on the bottom surface along one end edge of the form, and part A also has a series of spaced-apart line segments of adhesive 38 and 40 on the bottom surface along two lateral margins of the form.

Part B of the form 30 has two lines of adhesive 42 and 44 on the top surface (facing the viewer in FIG. 1) along the fold line 31. Part B also includes a series of spaced-apart line segments of adhesive 46 and 48 on the top surface along the two lateral margins of the form. Part B also includes a plurality of line segments of adhesive 47 and 49 on the bottom surface of the form 30 along the lateral margins of the form 30. Part B also includes two line segments of adhesive 50 and 52 on the bottom surface of the form 30 along the fold line 32.

Part C includes two line segments of adhesive 54 and 56 on the top surface of the document 30 along one edge of the document 30. Part C also includes a plurality of line segments of adhesive 60 and 62 along lateral margins of the document 30.

The form 30 could have other or different adhesive locations, and the form 30 could have a different folding arrangement. The system of the present invention will accommodate a variety of such variations. The form 30 may be folded along the fold lines 31 and 32 as shown in FIGS.

2 and 3 to form a tri-folded form. This may be done manually or by any suitable folding apparatus. One apparatus suitable for tri-folding a business form is illustrated in The Hedman Company U.S. Pat. No. 5,391,138, the details of which are incorporated herein by reference thereto to the extent not inconsistent herewith.

Because the adhesive on the form 30 is pressure-sensitive, it typically does not cause the tri-folded parts of the form to stick together unless and until significant pressure is applied to the folded form. The tri-folded form 30 must be subjected to pressure, at least in the regions containing the pressure-sensitive adhesive, so as to activate the adhesive and effect a sealing together of the form parts which are contacted with the adhesive. The pressure sealing of the tri-folded form 30 can be effected in a pressure sealer apparatus incorporating the novel pressure sealer roller arrangement of the present invention as illustrated in FIGS. 4–23 and described in detail hereinafter.

Figure 5:
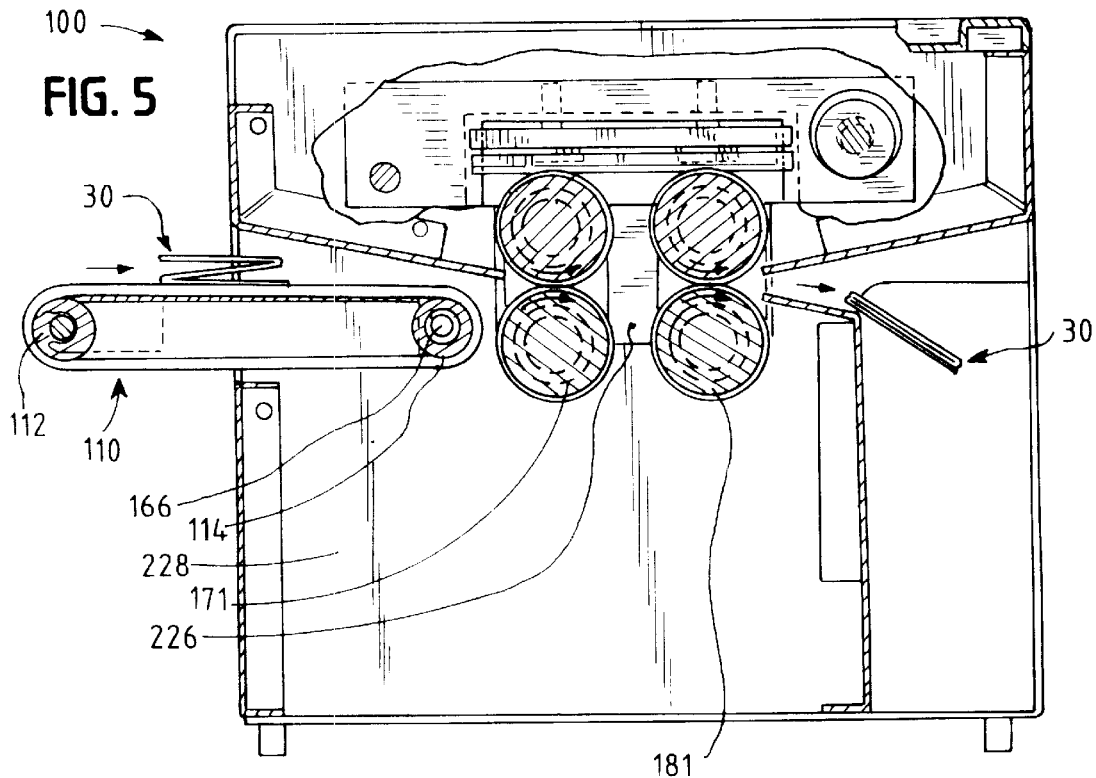
FIG. 5 is cross-sectional view taken along the plane 5—5 in FIG. 4 with portions of components broken away to illustrate interior details.

Referring now to FIGS. 4 and 5, the general arrangement and sequence of the operation of the pressure sealer apparatus can be readily understood. The pressure sealer apparatus is designated generally by the reference number 100 in FIGS. 4 and 5. In FIGS. 4 and 5, the apparatus 100 has an inlet or infeed end located on the left-hand side and has an outlet or outfeed end located on the right-hand side. The tri-folded sheet or form 30 is fed into the inlet or infeed end in a folded, but unsealed, condition. The tri-folded form 30 is then automatically fed through the apparatus 100 along a processing path where it is subjected to pressure to activate the pressure-sensitive adhesive and effect sealing of the tri-folded parts of the form 30. The sealed form 30 is automatically discharged from the outlet or outfeed end of the apparatus 100.

The apparatus 100 preferably includes exterior housing having side panels 101 and 102, inlet end panel 103, and a removable top panel or cover 104 (FIG. 4).

The apparatus 100 preferably includes an inlet. conveyor or in-feed conveyor 110 which includes an outer roll or elongate wheel 112 and a plurality of spaced, parallel, inner wheels 114 mounted in a suitable frame system 116 (FIGS. 4–6). Flexible, elastomeric drive rings or belts 120 are disposed around the wheels 112 and 114 as shown in FIG. 4.

The rings or belts 120 and the wheels 112 and 114 are rotated (clockwise as viewed in FIGS. 4 and 5) by a motor 130 (FIG. 6). Specifically, the motor 130 is mounted by suitable means (not visible in FIG. 6) within the apparatus 100 and includes a drive shaft 132 with a sprocket 134 engaged with a drive chain 136. The drive chain 136 is engaged with an upper, outlet roller sprocket 138 and also with an upper, inlet roller sprocket 140.

On the other side of the apparatus 100, as illustrated in FIG. 7, there is an upper, outlet roller gear 142 engaged with a lower, outlet roller gear 144, and there is an upper, inlet roller gear 146 engaged with a lower, inlet roller gear 148.

The upper, outlet roller sprocket 138 (FIG. 6) and the upper, outlet roller gear 142 (FIG. 7) are mounted on opposite ends of an upper, outlet roller shaft 150. The upper, inlet roller sprocket 140 (FIG. 6) and the upper, inlet roller gear 146 (FIG. 7) are mounted on opposite ends of an upper, inlet roller shaft 152.

The lower, outlet roller gear 144 (FIG. 7) is mounted on a lower, outlet roller shaft 154, and the lower, inlet roller gear 148 (FIG. 7) is mounted on a lower, inlet roller shaft 156. The end of the lower, inlet roller shaft 156 opposite from the gear 148 carries a drive wheel 160 (FIG. 6). A belt 162 extends around the wheel 156 and around a driven wheel 164 which is fixedly mounted on a shaft 166 on which the spaced-apart rollers 114 are fixedly mounted.

When the motor 130 is rotated in the counterclockwise direction as viewed in FIG. 6, the drive chain 136 will be rotated in the counterclockwise direction so as to rotate the upper sprockets 138 and 140 in the counterclockwise direction. On the other side of the apparatus 100, as viewed in FIG. 7, the upper, outlet roller shaft 150 and gear 142 will be rotated in the clockwise direction to effect counterclockwise rotation of the lower, outlet roller gear 144 and lower, outlet roller shaft 154. Similarly, the upper, inlet roller shaft 152 and gear 146 will be rotated in the clockwise direction to effect counterclockwise rotation of the lower, inlet roller gear 148 and shaft 156. On the other side of the apparatus, as viewed in FIG. 6, the lower, inlet roller shaft 156 will effect rotation of the drive wheel or pulley 160 in the clockwise direction. This causes rotation of the drive belt 162, wheel 164, and shaft 166 in the clockwise direction (as viewed in FIG. 6) so as to move the conveyor belts or rings 120 in the clockwise direction (as viewed in FIG. 6) to carry the tri-folded form 30 into the apparatus 100.

Figure 8:
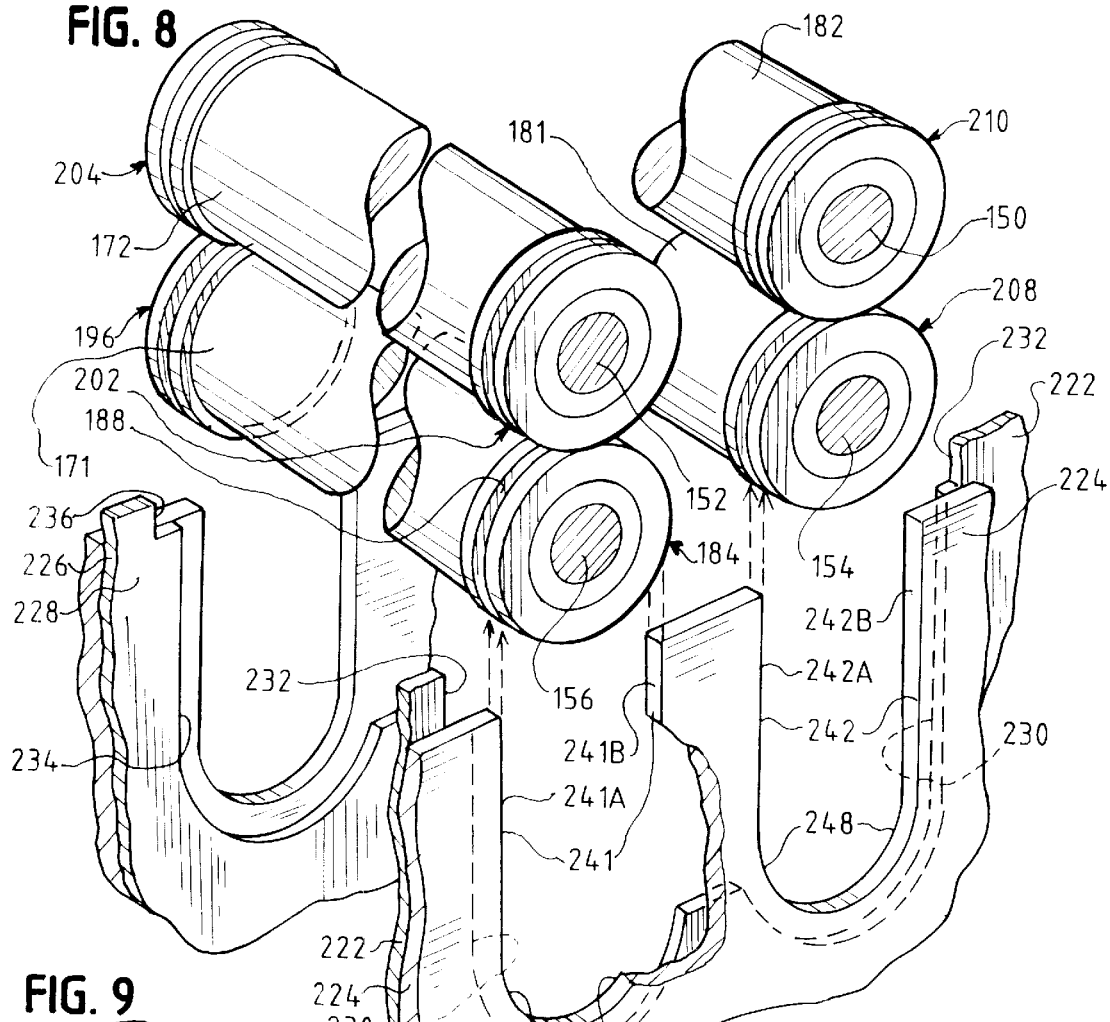
FIG. 8 is an exploded, fragmentary, simplified, perspective view of portions of the pressure sealer apparatus frame and cooperating inlet and outlet pairs of rollers.
Figure 11:
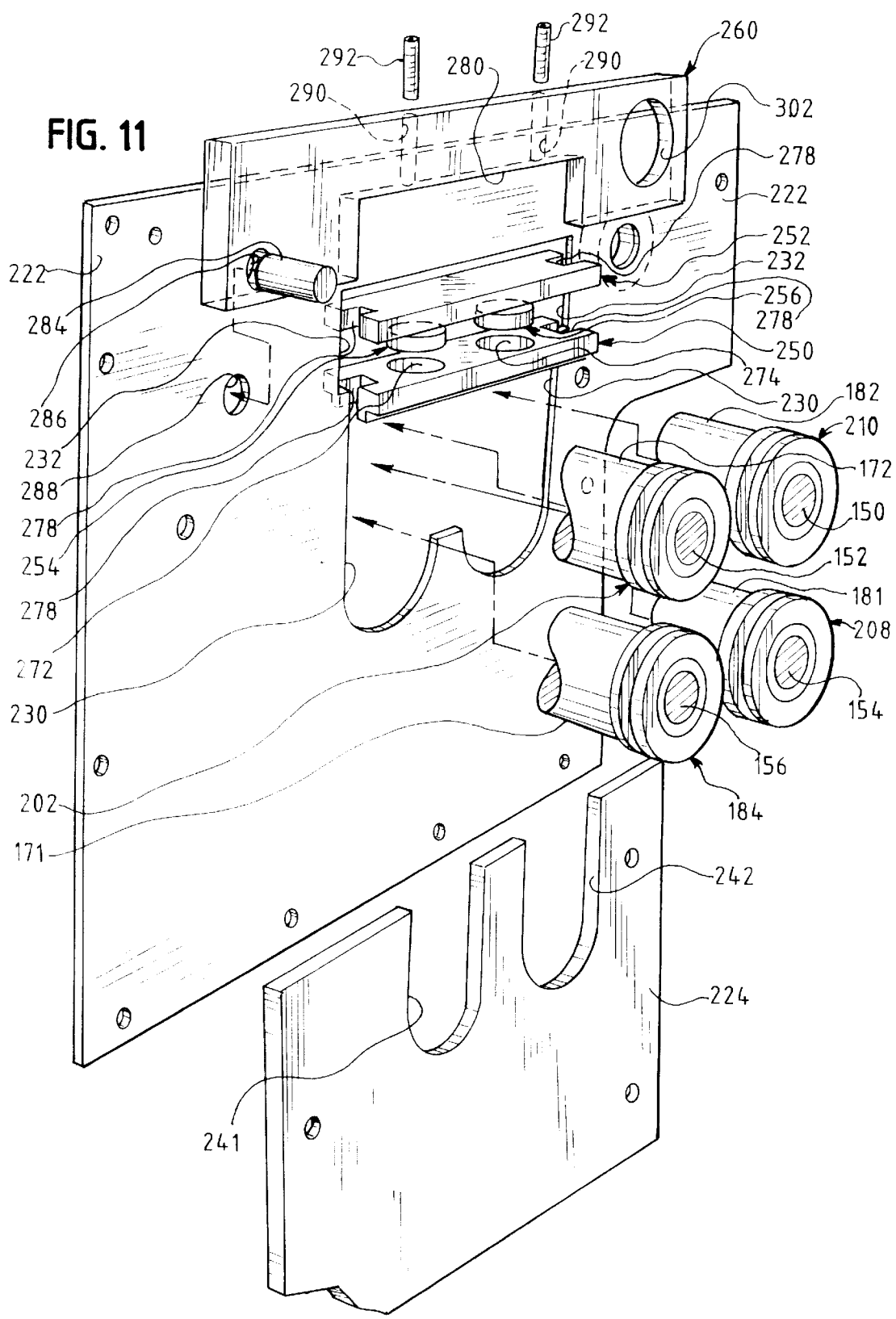
FIG. 11 is a fragmentary, simplified, exploded, perspective view of one side of the pressure sealer apparatus omitting the components of the other side end of the front and rear ends for ease of illustration.

As shown in FIGS. 8 and 11, the apparatus includes a pair of inlet rollers, a first or bottom inlet roller 171, and a second or upper inlet roller 172. The apparatus also includes a pair of outlet rollers, a first or bottom outlet roller 181 and a second, or top outlet roller 182. The nips defined between the pairs of inlet and outlet rollers may be characterized as defining at least a part of the processing path.

The first inlet roller 171 is fixedly mounted to the shaft 156, the second inlet roller 172 is fixedly mounted to the shaft 152. Thus, the lower, inlet shaft 156 and first inlet roller 171 are rotatable together as a unit, and the upper, inlet shaft 152 and second inlet roller 172 are rotatable together as a unit.

The first outlet roller 181 is fixedly mounted to the lower, outlet shaft 154, and the second outlet roller 182 is fixedly mounted to the upper, outlet shaft 150. Thus, the shaft 154 and first outlet roller 181 are rotatable together as a unit, and the shaft 150 and second outlet roller 182 are rotatable together as a unit.

Figure 10:
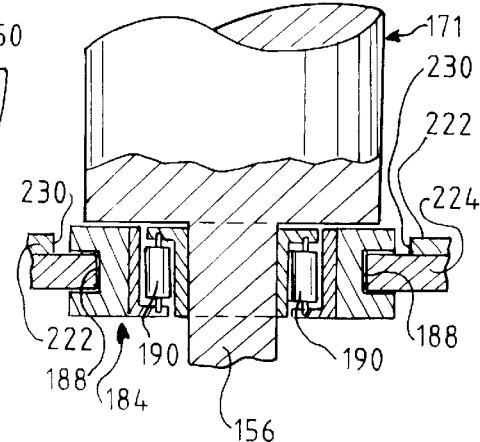
FIG. 10 is a fragmentary, greatly enlarged, partial, cross-sectional view taken generally along the plane 10—10 in FIG. 9.

Mounted to the shaft 156 at one end of the first inlet roller 171 is a bearing structure or bearing means 184 for accommodating rotation of the shaft 156 (and roller 171 therewith) relative to the apparatus 100. As illustrated in FIG. 10, the bearing structure 184 has a maximum exterior diameter that is slightly larger than the exterior diameter of the cylindrical surface of the first inlet roller 171. The exterior surface of the bearing structure 184 includes an annular groove 188. The inner portion of the bearing structure 184 includes needle bearings 190 in a housing structure to accommodate rotation of the shaft 156 relative to the exterior of the bearing structure 184.

On the shaft 156 at the other end of the first inlet roller 171 is another bearing structure 196 which is identical with the bearing structure 184. The ends of the upper or second inlet roller shaft 152 similarly has bearing structures 202 and 204 which are identical with the bearing structures 184 and 186.

Figure 9:
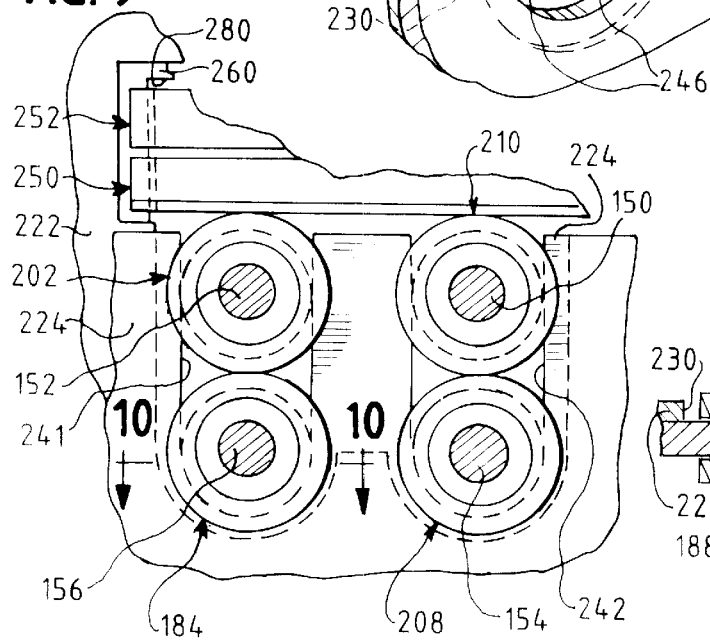
FIG. 9 is a fragmentary side view of the components shown in FIG. 8 along with additional components.

Similarly, there are bearing structures mounted to the outlet roller shafts 154 and 150 adjacent each end of each shaft, and two of these bearing structures 208 and 210 are visible in FIGS. 8 and 9 on the shafts 154 and 150, respectively, at the near end of the outlet rollers 181 and 182, respectively. Two other bearing structures 212 and 214 are visible in FIG. 12 on the opposite ends of the shafts 154 and 150, respectively.

The bearing structures 184, 196, 202, 204, 208, 210, 212, and 214 are each adapted to mount the respective roller ends in the apparatus frame which is located inwardly of, and covered by, the housing panels, such as housing panels 101 and 102 visible in FIGS. 4 and 7. The frame may be characterized as a support means having two lateral sides, and each side includes two principal plates: a large plate 222 and a small plate 224 on one side under the housing panel 102 as shown in FIG. 6, and a large plate 226 and small plate 228 on the other side under the housing panel 101 as shown in FIG. 7.

The basic shapes of the plates 222 and 224 can be seen in the exploded, perspective view in FIG. 11. On the other side of the apparatus, the plates 226 and 228 have a similar configuration. The frame preferably includes the four, individual side plates 222, 224, 226, and 228 for ease of manufacture and assembly. It will be appreciated, however, that in alternate designs, a fewer or greater number of plates could be used. In the preferred embodiment, the plate 224 is bolted to the plate 222, and the plate 228 is bolted to the plate 226.

With reference to FIGS. 8 and 11, it can be seen that the large frame plate 222 defines a central, lower cut-out portion 230, and the large frame plate 222 also defines an upper cut-out portion 232 which is wider than the lower cut-out portion 230 and which communicates with the top of a cut-out portion 230. Similarly, as can be seen in FIG. 8, the other side larger frame plate 228 defines a lower, central cut-out portion 234 and defines wider, upper cut-out portion 236 which communicates with the lower portion 234.

As can be seen in FIG. 11, the smaller frame plate 224 defines a pair of recesses 241 and 242 for receiving the roller bearing structures. As can be seen in FIG. 8, the margins of the smaller frame plate 224 adjacent the recess 241 extend laterally within the lower, central portion cut-out 230 of the larger frame plate 222. Similarly, the margins of the smaller frame plate 224 adjacent the recess 242 extend laterally within the lower, central portion cut-out 230 of the larger frame plate 222.

On the other side of the apparatus, a similar relationship exists. Specifically, as can be seen in FIGS. 5, 6, 7, and 8, the smaller frame plate 226 has a pair of spaced-apart recesses for receiving the roller bearing structures, and the margins of the smaller plate recesses extend laterally within the edges of the lower portion cut-out 234 in the larger frame plate 228.

With reference to near side frame plates 222 and 224 shown in FIGS. 8, 9, and 10, it will be appreciated that the recess 241 in the smaller frame plate 224 may be characterized as an inlet recess, and the recess 242 in the smaller frame plate 224 may be characterized as an outlet recess. The inlet recess 241 is adapted to receive the bearing structures 184 and 202 on the ends of the inlet rollers, and the outlet recess 242 is adapted to receive the bearing structures 208 and 210 on the ends of the outlet rollers. With reference to FIG. 8, the inlet recess 241 is defined by a pair of spaced-apart, parallel sidewalls 241A and 241B, and by a bottom closed end region 246. Similarly, the outlet recess 242 is defined by a pair of spaced-apart, parallel sidewalls 242A and 242B, and by a closed bottom end region 248.

As illustrated in FIGS. 9 and 10, the bearing structure 184 on the bottom, or first, inlet roller 171 is received at the bottom of the inlet recess 241. The bearing structure groove 188 receives the edges or margin of the smaller frame plate 224 adjacent the inlet recess 241.

The bearing structure 202 of the upper, or second, inlet roller 172 is received in the recess 241 on top of the lower, or first, roller bearing structure 184. The annular groove in the exterior of the bearing structure 202 similarly receives the edges or margins of the smaller frame plate 224 adjacent the inlet recess 241.

The bearing structures 184 and 202 are identical. The diameter of the exterior cylindrical surface of each bearing structure 184 and 202 is greater than the diameter of the cylindrical surface of the roller 171 and 172, respectively, to which the respective bearing structure is mounted. The bearing structures 184 and 202 are in direct engagement with each other (theoretically in line contact). This maintains a predetermined minimum spacing between the cylindrical surfaces of the first inlet roller 171 and second inlet roller 172 as diagrammatically illustrated in FIG. 18 where the spacing is designated by the upper case letter G. The spacing G between the cylindrical surface of the two inlet rollers 171 and 172 is predetermined, and is based upon a total thickness T of the folded document 30 which is to be pressure-sealed as described in detail hereinafter.

With reference to FIG. 9, the outlet roller bearing structures 208 and 210 are received in the smaller frame plate outlet recess 242 in a manner analogous to that described above with respect to the inlet roller bearing structures 184 and 202 in the inlet recess 241.

On the other side of the apparatus, the inlet roller bearing structures 196 and 204 (FIG. 8) and the outlet roller bearing structures 212 and 214 (FIG. 12) are similarly received within the frame recesses in the frame plate 228 in a manner analogous to that described above for the bearing structures 184, 202, 208, and 210 in the frame plate 224.

The roller bearing structures 184, 202, 208, and 210 are maintained in the smaller frame plate 224 on one side of the apparatus with a bottom end retention block 250, an inlet disk spring 254, an outlet disk spring 256, and a top end retention block 252. The top end retention block 252 is engaged with an adjustment means that includes an adjustment bar 260, a shaft 262 (FIG. 12) with a cam surface portion 264, and an operating lever 270 extending from the shaft 262.

The bottom end retention block 250 defines a first cavity 272 (FIG. 11) for receiving the bottom end of the inlet disk compression spring 254, and the bottom end retention block 250 defines a second cavity 274 (FIG. 11) for receiving the bottom end of the outlet disk compression spring 256. The top end of the inlet disk compression spring 254 and the top end of the outlet disk compression spring 256 are each engaged by the bottom, downwardly facing, flat surface of the top end retention block 252.

Each retention block 250 and 252 defines notches 278 at each end for receiving an adjacent vertical edge portion of the adjustment bar 260 which is defined along one of the vertical margins of a cut-out 280 (FIG. 11) in the bottom of the adjustment bar 260. The adjustment bar 260 is pivotally mounted to the larger frame plate 222 with a suitable shaft or pivot pin 284 which has one end received in a bore 286 in the adjustment bar and also has the other end received in a bore 288 in the plate 222.

Figure 14:
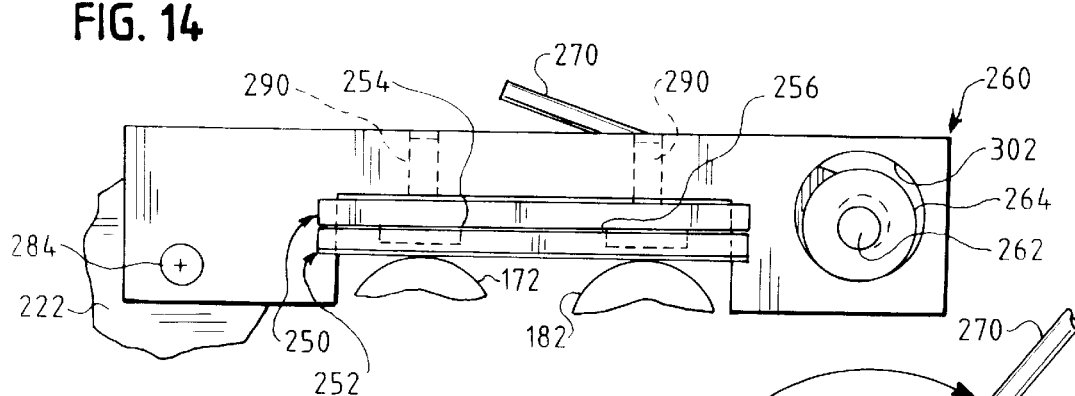
FIG. 14 is a fragmentary view of the components on one side of the upper portion of the pressure sealer apparatus.

The adjustment bar 260 defines a pair of threaded bores 290 (FIG. 11) for each receiving a threaded adjusting screw 292. The lower end of each adjusting screw 292 can be located to project a selected distance into the adjustment bar cut-out 280. The bottom ends of each projecting adjusting screw 292 engage the upper surface of the top end retention block 252. This establishes a predetermined degree of compression of the disk springs 254 and 256 when the operating lever 270 is at the normal operating position (FIGS. 6, 12, and 14). It is intended that the screws 292 be set by the manufacturer to accommodate the particular thickness of the folded business form 30 for which the apparatus is to be used. The purchaser or operator of the apparatus would not typically be expected to adjust the screws 292.

The adjustment bar 260 includes a bore 302 at one end for receiving the eccentric cam surface portion 264 on the shaft 262. The eccentric cam surface portion 264 may be provided as a cylindrical member that has a diameter greater than the diameter of the shaft 262 and that is mounted to the shaft 262 in an eccentric arrangement so that the longitudinal, rotational axis of the shaft 262 is parallel to, but laterally displaced from, the central, rotational axis of the cam surface portion 264.

The operating lever 270 is fixedly attached, as with a mounting block 208 (FIG. 12), to the shaft 262. When the lever 270 is in the normal operating position (as shown with solid lines in FIGS. 6 and 12), the eccentric portion 264 is positioned downwardly relative to the apparatus 100 so as to urge the end of the adjustment bar 260 to the lowest position (i.e., to the location of maximum rotation of the bar 260 about the pivot pin 284 in the counterclockwise direction as viewed in FIG. 12).

If the operating lever 270 is pulled outwardly (i.e., rotated in the clockwise direction as viewed in FIGS. 12 and 13 with reference to arrow 311), then the eccentric portion 264 on the shaft 262 is raised slightly relative to the bottom of the receiving bore 302 so that the disk springs 254 and 256 can expand somewhat and urge the adjustment bar 260 to pivot upwardly (i.e., counterclockwise, as viewed in FIG. 13 in the direction of the arrow 312). This necessarily reduces the compressive force acting on the roller bearing structures 202 and 210 through the bottom end retention block 250.

The pivoting movement of the operating lever 270 to the force-reduction location illustrated in FIG. 13 is effected by the apparatus operator if the document or documents 30 become jammed in the apparatus as described in detail hereinafter. Normally, the lever 270 is maintained in the "down" position illustrated in FIGS. 6 and 12.

The components on one side of the apparatus 100 for transferring force to, or relieving the force on, the upper roller bearing structures 202 and 210 accommodate movement of the upper roller bearing structures 202 and 210 away from the lower roller bearing structures 184 and 208, respectively, while still maintaining some force on the bearing structures as will be explained in detail hereinafter. Such a system is also employed on the other side of the machine with respect to the roller bearing structures 196, 204, 212, and 214. This can be seen with reference to FIG. 12 which shows that the other side of the apparatus includes a bottom end retention block 350, a top end retention block 352, a pair of disk springs 354 and 356, and an adjustment bar 360 pivotally mounted to the frame plate 228 with a pin 384. Threaded adjustment screws 392 are provided in the adjustment bar 360 for contacting the top of the top end retention block 352. The end of the adjustment bar 360 includes a bore 402 for receiving an eccentric cam surface portion 364 which is mounted on the end of the shaft 262. These components (as viewed on the far side of the apparatus 100 in FIG. 12) are assembled and operate in the same manner as described above with reference to the corresponding components on the near side of the apparatus (as viewed in FIG. 12).

The bottom end retention blocks 250 and 350, the inlet springs 254 and 354, the outlet springs 256 and 356, and the top end retention blocks 252 and 352 may together be characterized as a biasing means for urging the bearing means or bearing structures of the upper rollers 172 and 182 toward the bearing means or bearing structures of the lower rollers 171 and 181.

Figure 16:
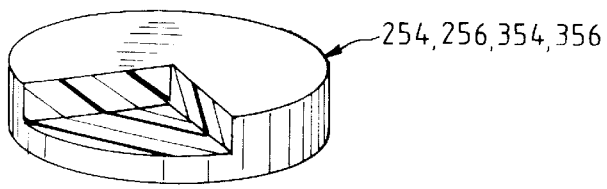
FIG. 16 is a greatly enlarged view of a disk-shaped polyurethane spring, of which there are four provided in the preferred form of the pressure sealer roller arrangement of the present invention.

Each compression spring 254, 256, 354, and 356 is preferably relatively short and stiff. In a presently contemplated, preferred embodiment, each spring is a disk-shaped piece of resilient, synthetic, polymer material, such as tooling polyurethane as shown in FIG. 16.

Figure 17:
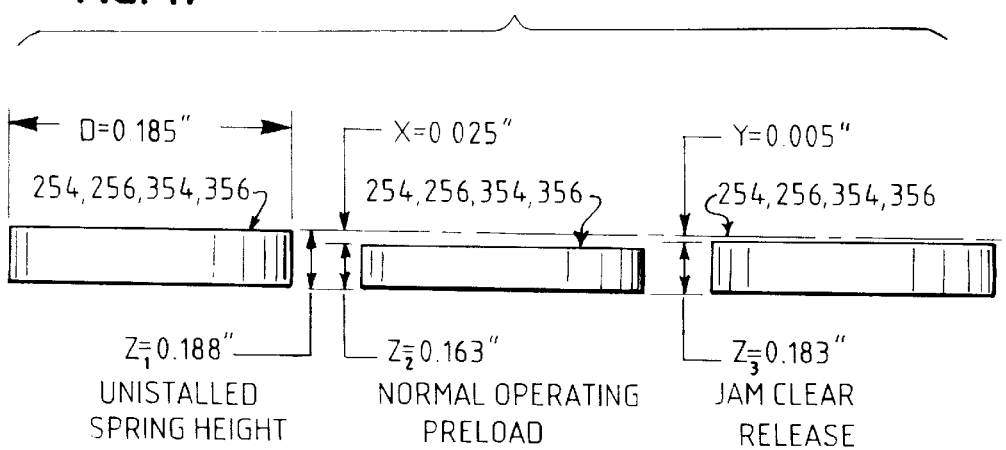
FIG. 17 is a greatly enlarged side, elevational view of the polyurethane disk spring shown in FIG. 16.

As shown in FIG. 17 for a preferred embodiment, the uninstalled height of each disk spring 254, 256, 354, and 356 is designated as $Z_1$ and is preferably 0.188 inch. The diameter of each spring is designated D and is preferably 0.875 inch.

Because the disk spring is relatively stiff, it exerts a significant force with a only a small amount of compression. It is contemplated that the preferred embodiment of the spring is especially suitable for use in the apparatus 100 to pressure-seal a folded business form 30 having a sheet thickness between 0.003 inch and 0.005 inch in a tri-fold configuration having a total, folded thickness of between about 0.009 inch and 0.015 inch. During normal operation of the apparatus 100 to pressure-seal such a tri-folded business form 30, each spring would be normally compressed or preloaded by an amount X (FIG. 17), preferably about 0.025 inch, so that the normal operating height (i.e., the normally compressed height) of each spring would be about 0.163 inch (dimension $Z_2$ in FIG. 17) when the apparatus is empty (i.e., when no tri-folded business form 30 is between the rollers).

Figure 18:
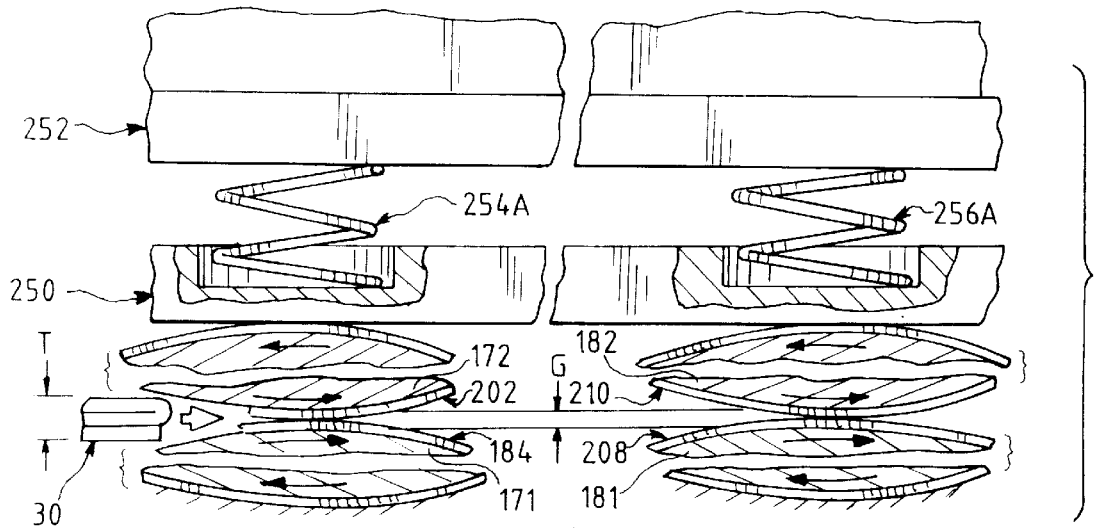

FIG. 18 diagrammatically illustrates the condition of the apparatus just prior to a tri-folded business form 30 entering between the inlet rollers 171 and 172. To better illustrate the compression of the springs, the springs are shown in FIGS. 18–23 as helical coil springs 254A and 256A corresponding to the preferred embodiment disk springs 254 and 256, respectively, on one side of the apparatus. The representation of the springs 254A and 256A as helical coil springs permits the amount of compression to be more readily seen in FIGS. 18–23.

The cylindrical surfaces of the inlet rollers 171 and 172 are spaced apart by the bearing structures 184 and 202 on one side of the apparatus (visible in FIG. 18) and by the bearing structures 196 and 204 on the other side of the apparatus (visible in FIG. 12). Similarly, the cylindrical surfaces of the outlet rollers 181 and 182 are spaced apart by the engagement between the outlet bearing structures 208 and 210 on one side of the apparatus (visible in FIG. 18) and by the bearing structures 212 and 214 on the other side of the apparatus (visible in FIG. 12).

In the presently contemplated preferred embodiment, where the apparatus is intended for use with a tri-folded business form 30 having a total thickness between about 0.009 inch and about 0.015 inch, the initial spacing G between the opposing cylindrical surfaces of each pair of rollers is between about 0.003 inch to about 0.004 inch before the form 30 is fed between them. The springs (e.g., as represented by helical coil springs 254A and 256A in FIG. 18) each exerts a substantial force on the bottom end retention block 250 which in turn exerts a substantial force on the upper inlet roller bearing structure 202 and on the upper outlet roller bearing structure 210 to maintain the upper inlet roller 172 and the upper outlet roller 182 at the predetermined spacing G with the upper roller bearing structures 202 and 210 engaged with the lower roller bearing structures 184 and 208, respectively. The upper and lower bearing structures on the other side of the apparatus are similarly forced together.

Figure 19:
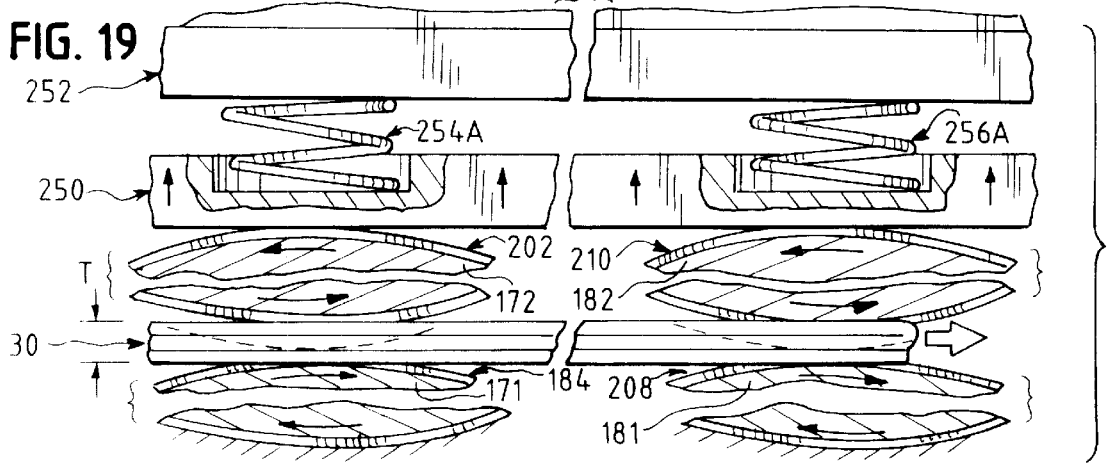

As the tri-folded business form 30 enters the space G at the nips of the inlet rollers 171 and 172 and outlet rollers 181 and 182, the upper rollers can move apart slightly (from the normal spacing of between about 0.003 inch and about 0.004 inch) to an increased spacing as illustrated in FIG. 19 to accommodate the tri-folded business form 30. This causes the springs to compress somewhat against the top end retention block (252 shown in FIG. 19 and block 352 shown in FIG. 12). The business form 30 may also be compressed slightly. As shown in FIG. 19, the rotating rollers pull the tri-folded business form 30 through the apparatus, and the force exerted by the springs activates the adhesive, and this causes the tri-folded portions of the tri-folded form 30 to become adhered together along the lines of the adhesive.

Figure 20:
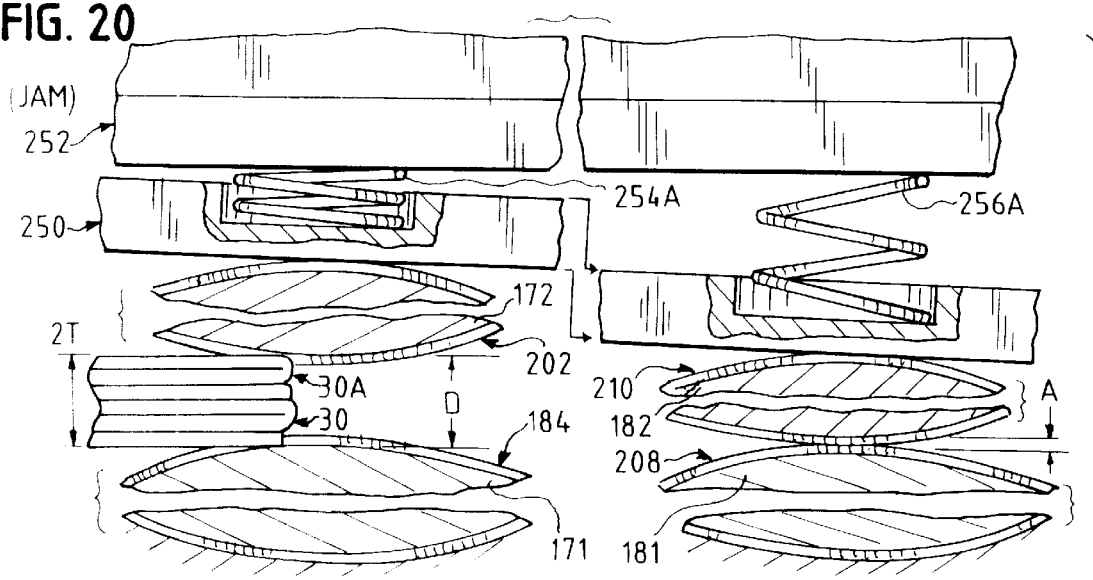

FIG. 20 illustrates the abnormal condition when a tri-folded form 30 is fed together along with a second tri-folded form 30A in a substantially overlapping relationship into the inlet rollers 171 and 172. The total thickness of the two tri-folded forms 30 and 30A is designated in FIG. 20 by the reference characters 2T. It can be seen that as the two forms enter the nip between the inlet rollers 171 and 172, at least the inlet spring (as represented by spring 254A in FIG. 20) is much further compressed. This necessarily imposed a greater spring force on the inlet roller 172. This greater force resists the turning torque of the motor (motor 130 described above with reference to FIG. 6). Typically, the motor 130 is sized for a normal operating condition where only one business form 30 at a time is fed between the rollers. Thus, the motor 130 may stall or stop rotating when two overlapping business forms 30 and 30A impose a much greater load on the motor 130. This creates a "jam" in the apparatus. The overlapping business forms 30 and 30A, in some instances, may also be fed further along the processing path partially into the outlet rollers 181 and 182 before the rollers stop rotating as the apparatus "jams."

Appropriate control circuitry (e.g., a 2 ampere circuit breaker) is preferably provided for shutting off the power to the motor 130 when the jam condition occurs. The details of such a control circuit form no part of the present invention. In any event, it is necessary to either remove the jammed forms 30 and 30A or otherwise effect operation of the components so as to move the "jammed" forms through the apparatus.

With the novel apparatus of the present invention, the jammed forms 30 and 30A can be moved through the apparatus after the operator performs a relatively simple operation. Specifically, the operator removes, or lifts up, the housing cover 104 (FIG. 4) to expose the operating lever 270 (FIG. 6). Preferably, the apparatus 100 includes a safety position switch 420 (FIG. 6) which is normally engaged by the closed cover 104. When the operator lifts the cover 104 upwardly, the switch 420 is actuated by an internal biasing mechanism to also interrupt the power circuit to the apparatus.

Figure 15:
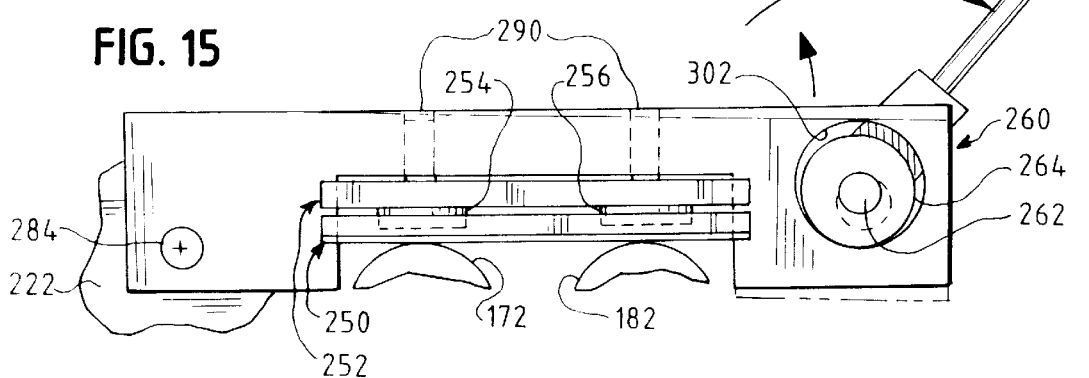
FIG. 15 is a view similar to FIG. 14, but FIG. 15 shows the jam-clearing lever rotated to the jam-release position.

Subsequently, the operator grasps the operating lever 270 and rotates it to the jam release position, or jam clearing position, illustrated in dashed lines in FIG. 6 and illustrated in solid lines in FIGS. 13 and 15. When the lever 270 is moved to the jam-release position, the cam surface portion 264 (FIG. 15) moves upwardly a small amount in the bore 302 of the adjustment bar 260 (and, similarly, on the other side of the apparatus, the cam surface portion 364 moves upwardly in the bore 402 of the adjustment bar 360). This permits the springs to move the adjustment bar upwardly a small amount so that the springs can extend somewhat and reduce the spring compression and, hence, reduce the compressive force that the springs exert downwardly on the bottom end retention blocks 250 (FIG. 21) and 350 (FIG. 12). Compare the compressed height of the inlet compression spring 254A in FIG. 20 (when the operating lever 270 is in the normal, down position) with the increased height or length of the spring 254A in FIG. 21 (after the operating lever 270 has been rotated to the jam-release, or jam-clearing, position). The two inlet springs (diagrammatically illustrated in FIG. 21 by the inlet spring 254A) thus now exert considerably reduced force on the inlet roller bearing structures 202 and 184 (and the outlet spring 256A also exerts less force on the outlet roller bearing structures). And, on the other side of the apparatus, the force on the inlet roller bearing structure 196 and 204 and outlet roller bearing structures 212 and 214 (FIG. 12) is also reduced.

The circuit breaker can then be re-set, and the switch 420 can be momentarily pressed to supply power to the electric motor 130. The motor 130 will now be able to again rotate the rollers because of the considerably reduced force exerted by the springs on the rollers. The rollers rotate to pull the two forms 30 and 30A through the inlet rollers into and against the outlet rollers 181 and 182.

As the leading portions of the forms 30 and 30A move against the outlet rollers 181 and 182, they are forced initially to become vertically centered along the centerline of the apparatus as shown in FIG. 22. FIG. 22 shows the leading edges of the forms 30 and 30A in dashed lines oriented about the centerline of the apparatus just touching the outlet rollers 181 and 182 which are also shown in dashed lines in FIG. 22. However, as the forms 30 and 30A are fed forward by the inlet rollers 171 and 172, the leading edges of the forms 30 and 30A are able to force the upper, outlet roller 182 upwardly (against the reduced force of the springs) so that the two forms 30 and 30A can be fed completely through the apparatus as shown in FIG. 23 and then discharged from the apparatus.

After the two forms 30 and 30A have been ejected from the apparatus, the operating lever 270 is returned to the normal, down position (FIGS. 6, 12, and 14) by the operator. Subsequently, the operator replaces the cover (104 in FIG. 4). The apparatus is now ready to resume normal operation wherein tri-folded business forms 30 are fed one at a time into the apparatus 100.

It will be appreciated that the above-described jam-clearing process will also work to clear the apparatus if it becomes jammed with a single tri-folded form 30 that is thicker than the normal business form for which the apparatus has been designed. For example, if a business form 30 is made of much thicker sheet stock, then the form will be much thicker when it is tri-folded. Such an increased thickness might cause the apparatus to jam even though only one tri-folded form is being fed. The above-described process for releasing the jam can be implemented to permit such a thicker, tri-folded form, to be released and fed through the apparatus.

FIG. 17 shows how the disk spring of the preferred embodiment reacts when the jam-clearing operation is effected by rotating the operating lever 270. In particular, with reference to FIG. 17, the springs 254, 256, 254, and 256 are permitted to increase in length when the operating lever 270 (FIG. 13) is rotated to the release position. The spring length increases from a normal operating pre-load, or compressed, length $Z_2$ to a greater length or height $Z_3$. In the preferred embodiment, the jam-clearing release height $Z_3$ of each spring is about is about 0.183 inch. It will be appreciated that when the operating lever 270 is in the release position to reduce the compression of the springs, the springs are still slightly compressed by an amount Y which, in the preferred embodiment, is about 0.005 inch. Thus, there is still a sufficient force exerted by the springs on the roller bearing structures so as to provide some frictional engagement between the rollers and the business forms so that the business forms can be fed through the apparatus.

It will be appreciated that many of the components of the apparatus 100 described above may have other shapes or configurations. For example, although the springs 254, 256, 354, and 356 are preferably disk-shaped pieces of tooling polyurethane material, the present invention does not exclude the possibility of using other materials or other spring shapes, including helical coil springs or other types of springs. However, it has been found that the disk-shaped tooling polyurethane springs provide sufficient stiffness and minimal extension so that the operation of the jam-clearing system can be optimized so as to permit the use of a simple lever (e.g., lever 270) which need be rotated through only a relatively small arc to release the jam. The use of such a disk-shaped tooling polyurethane spring (which is relatively stiff, and which undergoes only a small length change between maximum and minimum compression during the jam-clearing operation) permits the system to function exceptionally well even when the system must be designed to apply relatively high loads to the components to effectively activate the adhesive and create a proper pressure seal of the folded business form portions.

Other components may also have shapes different from those illustrated for the preferred embodiment. For example, the bottom end retention blocks 250 and 350 and the top end retention blocks 252 and 352 may have different configurations. A lesser or greater number of blocks may be used. In one alternative (not illustrated), the blocks 250 and 350 could be combined into one large block, and the blocks 252 and 352 could be combined into one large block. Alternatively, each block 250, 252, 350, and 352 could be divided into two separate blocks.

The preferred embodiment employs two adjustment bars 260 and 360. In an alternate embodiment, a single adjustment bar may be provided with appropriate structures extending from such a single adjustment bar to engage one or more top retention blocks as may be employed in such an alternate embodiment.

Also, the lever, shaft, and cam mechanism for pivoting the adjustment bars 260 and 360 to release the spring compression may be changed.

Further, if desired, the apparatus could be configured to employ only one compression spring located in a part of the apparatus with a retention structure suitable for simultaneously engaging, directly or indirectly, all four upper roller bearing structures.

Also, the inlet rollers (e.g., rollers 171 and 172) may simultaneously function as the outlet rollers of a business form folding apparatus (not illustrated) operating integrally with the upstream (front) end of the pressure sealer apparatus.

In a preferred arrangement, when a jam occurs, a circuit breaker trips in the pressure sealer apparatus 100 to shut off the electrical power to the motor. Also, if the pressure sealer apparatus 100 is used in conjunction with an upstream business form folder apparatus (not illustrated), then such an upstream folder apparatus can be powered from an electrical line plugged into the pressure sealer apparatus 100 power circuit so that when the pressure sealer apparatus power is shut off upon occurrence of a jam, power is also cut off to the upstream folder apparatus.

It will be readily apparent from the foregoing detailed description of the invention and from the illustrations thereof that numerous variations and modifications may be effected without departing from the true spirit and scope of the novel concepts or principles of this invention.

What is claimed is:

1. In a pressure sealer for activating pressure-sensitive adhesive on one portion of a folded business form to seal the one portion to another portion of the business form wherein the folded business form is fed along a processing path between a pair of cooperating, rotating, first and second inlet rollers and a pair of cooperating, rotating, first and second outlet rollers, an arrangement for mounting the rollers comprising:

a roller support frame defining (a) a pair of inlet recesses spaced apart so that one of the inlet recesses is on one side of said processing path and so that the other of said inlet recesses is on the other side of said processing path, and (b) a pair of outlet recesses spaced apart so that one of said outlet recesses is on one of said processing path and so that the other of said outlet recesses is on the other side of said processing path;

each said roller having a pressure-applying, cylindrical surface, each said roller having two spaced-apart bearing structures which are each received in a respective one of said recesses to mount said pair of inlet rollers extending between said inlet recesses and to mount said pair of outlet rollers extending between said outlet recesses, said frame preventing movement of said bearing structures of said first inlet roller away from said bearing structures of said second inlet roller, said frame preventing movement of said bearing structures of said first outlet roller away from said bearing structure of said second outlet roller, said inlet recesses accommodating movement of said bearing structures of said second inlet roller away from said bearing structures of said first inlet roller, and said outlet recesses accommodating movement of said bearing structures of said second outlet roller away from said bearing structures of said first outlet roller, each said bearing structure in each one of said recesses accommodating rotation of a respective one of said rollers and having an exterior surface engaging an exterior surface of the other bearing structure in said one recess to define a predetermined minimum spacing between said cylindrical surfaces of said inlet rollers and to define a predetermined minimum spacing between said cylindrical surfaces of said outlet rollers;

two inlet compression springs each having a top end and a bottom end, and each inlet compression spring associated with a respective one of said inlet recesses to urge one of said bearing structures of said second inlet roller toward one of said bearing structures of said first inlet roller in a respective one of said inlet recesses;

two outlet compression springs each having a top end and a bottom end, and each outlet compression spring associated with a respective one of said outlet recesses to urge one of said bearing structures of said second outlet roller toward one of said bearing structures of said first outlet roller in a respective one of said outlet recesses;

two adjustment bars each pivotally mounted to said frame for bearing a load imposed by one of said inlet compression springs and by one of said outlet compression springs;

a shaft with cam surface portions engaging said adjustment bars for urging said adjustment bars to compress said springs; and an operating lever which extends from said shaft and which can be pivoted to rotate said shaft and cam surface portions to effect a reduction or increase in the compression of said springs.

2. The roller mounting arrangement in accordance with claim 1 further including a pair of bottom end retention blocks which each has a cavity for receiving a bottom end of one of said inlet compression springs and a cavity for receiving a bottom end of one of said outlet compression springs, each said bottom end retention block also having an exterior engaging surface for engaging one of said bearing structures of said second inlet roller and for engaging one of said bearing structures of said second outlet roller; and a pair of top end retention blocks for each engaging a top end of one of said inlet compression springs and a top end of one of said outlet compression springs, each said top end retention block engaging one of said adjustment bars.

3. The roller mounting arrangement in accordance with claim 1 in which each said recess in said frame has a closed bottom end; and said bearing structures of said first inlet roller and of said first outlet roller are each seated in said frame at said closed bottom ends of said inlet and outlet recesses, respectively, to prevent (1) movement of said first inlet roller away from said second inlet roller, and (2) movement of said first outlet roller away from said second outlet roller.

4. The roller mounting arrangement in accordance with claim 1 in which said compression springs each comprises a piece of resilient, synthetic, polymer material.

5. In a pressure sealer for activating pressure-sensitive adhesive on one portion of a folded business form to seal the one portion to another portion of the business form wherein the folded business form is fed along a processing path between at least one pair of cooperating, rotating, first and second rollers, an arrangement for mounting the rollers comprising:

a roller support frame defining at least one pair of recesses which are spaced-apart so that one of said recesses is on one side of said processing path and so that the other of said recesses is on the other side of said processing path;

each said roller having a pressure-applying, cylindrical surface, each said roller having two spaced-apart bearing structures which are each received in a respective one of said recesses to mount said pair of rollers extending across said processing path between said recesses, said frame preventing movement of said bearing structures of said first roller away from said bearing structures of said second roller, said recesses accommodating movement of said bearing structures of said second roller away from said bearing structures of said first roller, each said bearing structure in each one of said recesses accommodating rotation of a respective one of said rollers and having an exterior surface engaging an exterior surface of the other bearing structure in said one recess to define a predetermined minimum spacing between said roller cylindrical surfaces;

at least one compression spring for urging said bearing structures of said second roller toward said bearing structures of said first roller;

at least one adjustment bar pivotally mounted to said frame for bearing a load imposed by said compression spring;

a shaft with a cam surface portion engaging said adjustment bar and urging said adjustment bar to compress said spring; and an operating lever which extends from said shaft and which can be pivoted to rotate said shaft and cam surface portion to effect a reduction or increase in the compression of said spring.

6. The roller mounting arrangement in accordance with claim 5 in which said frame has a pair of spaced-apart, parallel walls; and each said bearing structure has a cylindrical exterior surface defining an annular groove in which is received a portion of one of said walls at the margin of one of said recesses.

7. The roller mounting arrangement in accordance with claim 5 in which each said recess in said frame has a closed bottom end; and said bearing structures of said first roller are each seated in said frame at a respective one of said closed bottom ends of said recesses to prevent movement of said first roller away from said second roller.

8. The roller mounting arrangement in accordance with claim 5 in which said compression spring comprises a piece of resilient, synthetic, polymer material.

9. The roller mounting arrangement in accordance with claim 5 further including a bottom end retention block and a top end retention block carried on said support frame to retain said at least one compression spring between said bottom and top end retention blocks.

10. In a pressure sealer for activating pressure-sensitive adhesive on one portion of a folded business form to seal the one portion to another portion of the business form wherein the folded business form is fed along a processing path between at least one pair of cooperating, rotating, first and second rollers, an arrangement for mounting the rollers comprising:

support means for holding said rollers with said first roller at a fixed location while accommodating movement of said second roller along a plane in either of two opposite directions toward and away from said first roller;

a piece of resilient, synthetic polymer material retained under compression between bottom and top retention blocks which are carried on said support means to accommodate movement of said bottom retention block toward and away from said top retention block while said bottom retention block engages a portion of said second roller for imposing the load from said polymer material on said second roller; and adjustment means carried on said support means for engaging said top retention block and adjustably setting the maximum spacing of said top retention block from said bottom retention block to effect a reduction or increase in the compression of said polymer material.

11. The roller mounting arrangement in accordance with claim 10 in which said support means includes a frame having a pair of spaced-apart, parallel walls defining recesses for accommodating ends of said rollers.

12. The roller mounting arrangement in accordance with claim 10 in which said adjustment means includes an adjustment bar mounted to said support means for pivotal movement toward and away from said rollers.

13. The roller mounting arrangement in accordance with claim 12 in which said adjustment means further includes (a) a shaft with a cam surface portion engaging said adjustment bar, and (b) an operating lever which extends from said shaft and which can be pivoted to rotate said shaft and cam surface portion against said adjustment bar.

14. The roller mounting arrangement in accordance with claim 10 in which each said roller has (a) a pressure-applying, cylindrical surface, and (b) two spaced-apart bearing structures for each engaging said support means to accommodate rotation of said cylindrical surface of each said roller.

15. In a pressure sealer for activating pressure-sensitive adhesive on one portion of a folded business form to seal the one portion to another portion of the business form wherein the folded business form is fed along a processing path between at least one pair of cooperating, rotating, first and second rollers, an arrangement for mounting the rollers comprising:

support means for holding said rollers with said first roller at a fixed location while accommodating movement of said second roller along a plane in either of two opposite directions toward and away from said first roller;

each said roller having a pressure-applying, cylindrical surface, each said roller having two spaced-apart bearing means for engaging said support means to accommodate rotation of a respective one of said rollers and for engaging one of said bearing means of said other roller to define a predetermined minimum spacing between said cylindrical surfaces of said first and second rollers;

at least one biasing means for urging said bearing means of said second roller toward said bearing means of said first roller;

at least one adjustment bar pivotally mounted on said support means for bearing a load imposed by said at least one biasing means;

cam means for engaging said adjustment bar and urging said adjustment bar to compress said biasing means; and an operating lever which extends from said cam means and which can be pivoted to rotate said cam means to effect a reduction or increase in the compression of said biasing means.

16. The roller mounting arrangement in accordance with claim 15 in which said frame means has a pair of spaced-apart, parallel walls each defining a recess for receiving one of said bearing means of said first roller and one of said bearing means of said second roller; and each said bearing means has a cylindrical exterior surface defining an annular groove in which is received a portion of one of said frame walls at the margin of one of said recesses.

17. The roller mounting arrangement in accordance with claim 15 in which said biasing means includes (a) at least two compression springs, one of said springs being located on one side of said processing path and the other of said springs being located on the other side of said processing path, and (b) a pair of bottom end retention blocks which each has a cavity for receiving a bottom end of one of said compression springs, each said bottom end retention block having an exterior engaging surface for engaging one of said bearing means of said first roller.

18. The roller mounting arrangement in accordance with claim 17 in which said biasing means further includes a pair of top end retention blocks for each engaging a top end of one of said compression springs, each said top end retention block also engaging said adjustment bar.

19. The roller mounting arrangement in accordance with claim 15 in which said biasing means comprises a piece of resilient, synthetic, polymer material having a solid cylindrical shape.

20. The roller mounting arrangement in accordance with claim 15 in which said cam means includes a shaft with an eccentric cam surface portion engaging said adjustment bar.

* * * * *